(12) United States Patent
Sandner et al.

(10) Patent No.: US 7,403,835 B2
(45) Date of Patent: Jul. 22, 2008

(54) DEVICE AND METHOD FOR PROGRAMMING AN INDUSTRIAL ROBOT

(75) Inventors: Harald Sandner, Reichenbach (DE); Hans-Joachim Neubauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/436,763

(22) Filed: May 19, 2006

(65) Prior Publication Data
US 2006/0287772 A1 Dec. 21, 2006

Related U.S. Application Data

(63) Continuation of application No. PCT/EP2004/012829, filed on Nov. 12, 2004.

(30) Foreign Application Priority Data
Nov. 22, 2003 (DE) ................. 103 54 642

(51) Int. Cl.
*G05B 19/04* (2006.01)
(52) U.S. Cl. ............... 700/253; 700/245; 700/256; 700/264; 318/568.11; 901/1; 901/3; 712/200; 712/300; 375/240.1; 701/23
(58) Field of Classification Search ............ 700/245, 700/256, 264, 253; 901/3, 1; 701/23; 318/568.11; 375/241.1; 712/200, 300; 361/71–75, 380, 361/383; 714/15, 24
See application file for complete search history.

(56) References Cited

U.S. PATENT DOCUMENTS

| 4,987,527 | A | | 1/1991 | Hamada et al. |
| 6,134,102 | A | * | 10/2000 | Worn et al. ................. 361/680 |
| 6,356,806 | B1 | * | 3/2002 | Grob et al. .................. 700/245 |
| 2002/0153184 | A1 | | 10/2002 | Song et al. |
| 2006/0217877 | A1 | * | 9/2006 | Bodin et al. ................ 701/206 |

FOREIGN PATENT DOCUMENTS

| DE | 101 64 278 A1 | 10/2002 |
| EP | 1 304 194 A2 | 4/2003 |
| EP | 1 310 843 A2 | 5/2003 |
| JP | 2001-150373 | 6/2001 |
| WO | WO 94/06249 | 3/1994 |
| WO | WO 95/01757 | 1/1995 |
| WO | WO 03/019423 A1 | 3/2003 |

OTHER PUBLICATIONS

International Search Report for PCT/EP2004/012829 dated Apr. 3, 2005.
German Search Report for 103 54 642.1 dated Nov. 11, 2004.

* cited by examiner

*Primary Examiner*—Khoi H. Tran
*Assistant Examiner*—McDieunel Marc
(74) *Attorney, Agent, or Firm*—Crowell & Moring LLP

(57) ABSTRACT

In a device and method for programming an industrial robot using a simulation program, control commands are issued by a handheld programming device and these commands are visualized on an image surface as movement and/or processing operations by the robot on the basis of data of the robot. An object to be processed is also displayed on the image surface and a three-dimensional image of the robot and the object is presented.

10 Claims, 2 Drawing Sheets

DEVICE AND METHOD FOR PROGRAMMING AN INDUSTRIAL ROBOT

CROSS REFERENCE TO RELATED APPLICATIONS

This application is a continuation of International Patent Application No. PCT/EP2004/012829 filed Nov. 12, 2004, and claims priority under 35 U.S.C. § 119 to German Patent Application No. 103 54 642.1 filed Nov. 22, 2003. The entire disclosure of these documents is herein expressly incorporated by reference.

BACKGROUND AND SUMMARY OF THE INVENTION

The present invention relates to a device and a method for programming an industrial robot. In particular, a three-dimensional movement path with respect to a three-dimensional object to be machined is generated and stored using this program.

Robot programs may be created offline and online.

It is known that in offline programming so-called simulation software is used as follows: the geometry and kinematics of the robot, the workplace of the robot and the object, e.g., a vehicle body, are stored in a computer as a mathematical model and/or as CAD data, and from this data a two-dimensional image on a display screen is obtained by using a graphics program. The existence of an actual object or even a robot is not necessary for this process. The CAD data and/or the mathematical model contains all the kinematic functionalities, including a prototype of an actual vehicle body and a robot in a robot system, for example. Using this simulation software, all movement paths of the robot may also be displayed on the display screen. The movement paths may be stored and then practiced on a real object using a real robot.

The operation of the simulation software requires a high level of education and ongoing training to achieve efficient use. One example of such simulation software is available commercially under the brand name "eM-Workplace" from the company Tecnomatix GmbH. However, there is the advantage that a concrete object need not be produced.

In online programming, also referred to as real programming, there is a real object, e.g., a vehicle body and a real robot. A control panel is provided for path control. Programming may be performed only when there is an actual design model of the components. The robot can be positioned at various points in space by using a handheld programming device. These points are assigned properties with respect to their approach (linear, circular, etc.) and a definition with regard to their orientation in space.

The points saved as a whole here again yield a robot program. This represents each operation of the robot and may be reproduced as often as desired. Operation of a handheld programming device can be mastered quickly by an experienced robot programmer and can even be learned quickly by an unskilled operator. This advantage must be seen against the disadvantage of having to produce a concrete object, which is expensive in terms of both time and money.

The object of the present invention is to create a method and a device with which the programming process may be carried out quickly and easily.

This object is achieved for the process using a method and a device for programming an industrial robot using a simulation program.

With the present invention, the efficiency of operation of a handheld programming device is combined with the functionality of the robot simulation software. The high functionality of the robot simulation and its lack of dependence on real hardware are associated with efficient and easily learned operation of real robots.

Through three-dimensional visualization of the robot and the object, a spatial impression is given even in the case of complex geometries, and programming of the robot control is facilitated. The advantages of robot simulation, including ease of handling and learnability, are thus made accessible to the user of conventional programming systems.

The core of the present invention is a link between real programming of robots and programming using robot simulations. This coupling takes over the traditional functionalities of a real handheld programming device and supplements them with additional functionalities of simulation.

An advantageous refinement of the present invention consists of wirelessly connecting the handheld programming device to the robot control unit in which the robot simulation program is contained and activated. By three-dimensional display of the (virtual) robot and (virtual) object, it is possible to program the movement paths and working steps of the robot rapidly and reliably by using the information for programming real robots without any particular training.

Other objects, advantages and novel features of the present invention will become apparent from the following detailed description of the invention when considered in conjunction with the accompanying drawings.

DETAILED DESCRIPTION OF THE DRAWINGS

The present invention is explained in greater detail on the basis of an exemplary embodiment.

Figure 1:
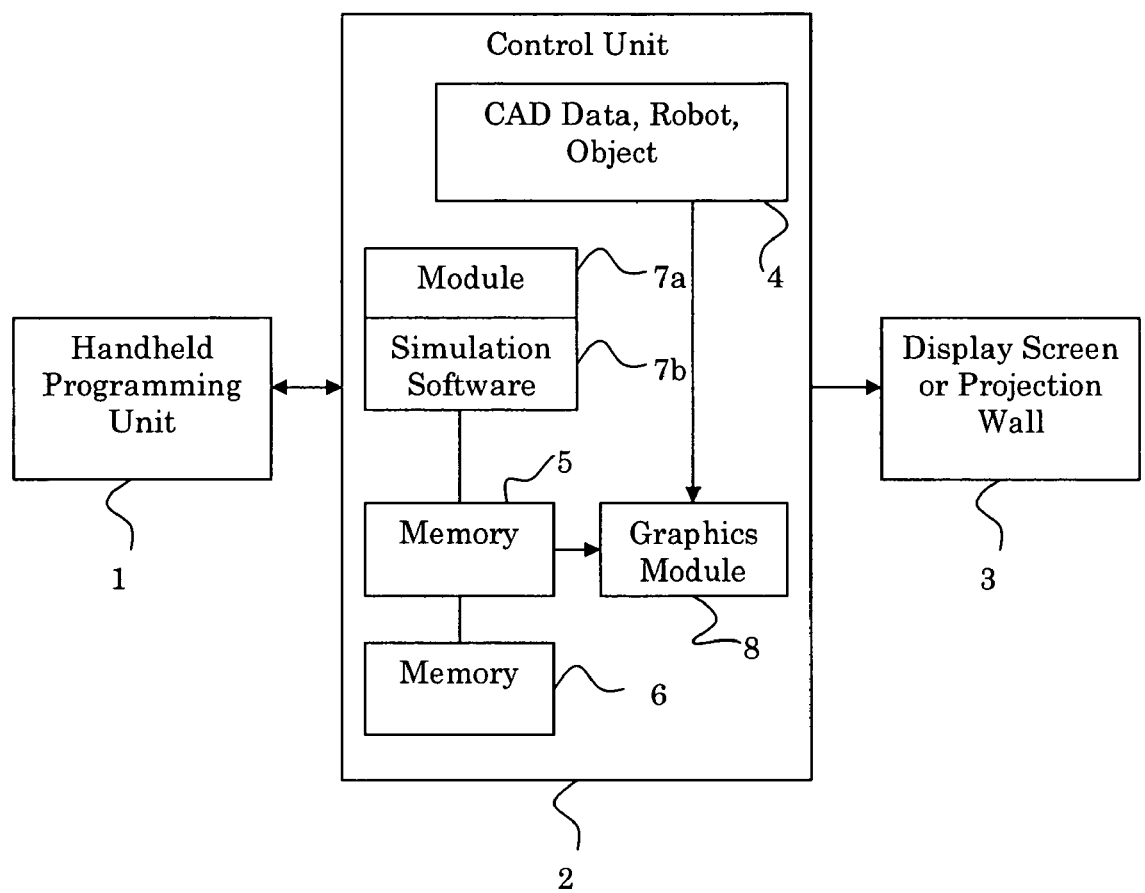
FIG. 1 illustrates an exemplary embodiment of a device for programming an industrial robot, in accordance with the present invention.

FIG. 1 illustrates the essential components of the inventive device for virtual programming of an industrial robot. These components include a handheld programming unit 1, a control unit 2 and a display screen 3. With this handheld programming device 1, the functions to be executed by the industrial robot (not shown and not actually present within the scope of the invention) are selected by input of commands via a keyboard (not shown), which is provided in the handheld programming device 1. These functions are as follows, for example:

1. Moving the robot in world coordinates or relative coordinates
2. Controlling the individual axes of the robot
3. Generating approach points
4. Generating paths
5. Modifying the paths and approach points
6. Approaching the approach points
7. Departing from the paths These commands are relayed wirelessly to the control unit 2, which contains a memory 4 for the data of an object to be handled by the robot, e.g., a vehicle body, a memory 5 for the data of the robot and the approach points, a memory 6 for the changes in the data of the robot and the time sequence of these changes, a program module 7a for processing the commands for the simulation software issued by the handheld programming device 1, a simulation software 7b for converting the commands issued by the handheld programming device 1 into corresponding specifications for altering the data of the robot and the approach points to the memory 5 and a graphics program 8. The wireless transmission may be a Bluetooth transmission. The graphics program 8 controls the image contents to be displayed on the image surface 3.

The function commands (movement of the robot, etc.) that can be selected with the handheld programming device 1 are transmitted to the simulation software 7b.

Communication with the simulation software 7b is bidirectional, i.e., commands and data are transmitted in mutual exchange. Bidirectional communication ensures transmission of commands issued by the handheld programming device 1 to the simulation software 7b and transmits a preset selection of robot data and object data. The individual selection is also made by the programming device 1.

Figure 2:
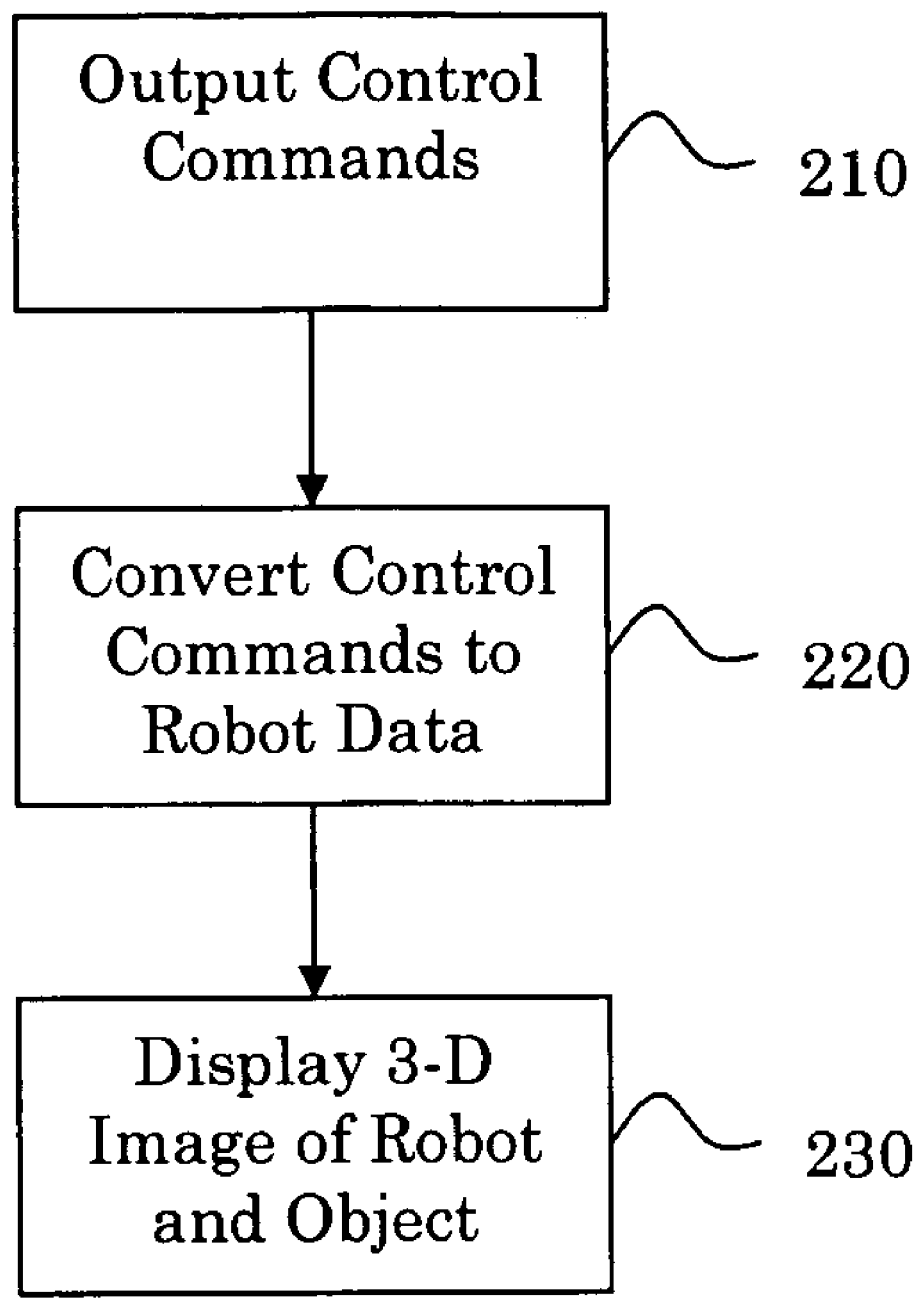
FIG. 2 illustrates an exemplary embodiment of a method for programming an industrial robot, in accordance with the present invention.

FIG. 2 illustrates an exemplary embodiment of a method for programming an industrial robot, in accordance with the present invention. In step 210, the handheld programming device outputs the control commands, as described above. In step 220, the control commands are converted into robot data. The incoming commands are converted in the control unit 2 into corresponding specifications in the memory 5, and thus a change in the data of the robot and the startup points is implemented. The new robot data and approach points are relayed to the graphics program 8 and displayed as revised image content on the display surface via a projection unit (not shown). At the same time, the changes are stored in the memory 6 as described above.

In step 230 of FIG. 2, a three-dimensional image of the robot and the object to be processed may be displayed on the image surface. A projection wall may be used as the image surface. Thus, complex objects and graphic relationships in particular can be displayed in a comprehensible manner.

The respective object and the industrial robot are imaged on the projection wall. The display appears to be three-dimensional. To do so, first a projected stereoscopic image is generated using a suitable graphics module. On the other hand, a three-dimensional effect of the view for the user is simulated if the user wears so-called shutter eyeglass lenses, which darken and release one eyeglass lens at a time in rapid sequence. The shutter lens and the stereoscopic image are synchronized by the graphics module.

The user gets a three-dimensional impression of both the object and the robot and can control it via the handheld programming device 1. Controlling means not only determining the path of movement of the robot but also the respective labor steps such as welding, painting, etc. by means of suitable devices, also shown in FIG. 1.

By means of additional functions which can also be selected with the handheld programming device 1, improved movement of the robot in the virtual visualized robot system is possible:

1. Rotating the view of the object and the robot in all degrees of freedom
2. Enlarging the view
3. Three-dimensional view Finally, a tracking device may also be provided, which detects the head movement and alignment of the user's head and automatically adjusts the view accordingly. It is thus possible to approach, for example, a machining site of the robot that is difficult to observe and to control it with especially high precision there.

It is thus possible to obtain a program for controlling the robot even before the object is available and cooperating with a robot that is physically present. This makes it possible to study and preprogram complete manufacturing sequences even before the manufacturing plant has been erected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for programming an industrial robot using a simulation program, the method comprising the acts of:
    outputting control commands from a handheld programming device and visualizing the control commands as movement processes or machining operations by the robot on an image surface, based upon robot data,
    displaying an object to be processed on the image surface, and
    presenting a three-dimensional image of the robot and the object to be processed on the image surfaces,
    wherein a position of an operator and a change in position are detected, and from the position and the change in position, an adjustment of an angle of view and the image content with regard to the perspectives and distance is derived.

2. The method as claimed in claim 1, wherein the three-dimensional image is arbitrarily modified in its optical imaging properties.

3. The method as claimed in claim 1, wherein the control commands are wirelessly transmitted from the handheld programming device to a control unit.

4. The method as claimed in claim 3, wherein the wireless transmission comprises a Bluetooth transmission.

5. The method as claimed in claim 1, wherein the image surface comprises a projection wall.

6. A method for programming an industrial robot using a simulation program, the method comprising the acts of:
    outputting control commands from a handheld programming device and visualizing the control commands as movement processes and machining operations by the robot on an image surface, based upon robot data,
    displaying an object to be processed on the image surface, and
    presenting a three-dimensional image of the robot and the object to be processed on the image surface,
    wherein a position of an operator and a change in position are detected, and from the position and the change in position, an adjustment of an angle of view and the image content with regard to the perspectives and distance is derived.

7. The method as claimed in claim 6, wherein the three-dimensional image is arbitrarily modified in its optical imaging properties.

8. The method as claimed in claim 6, wherein the control commands are wirelessly transmitted from the handheld programming device to a control unit.

9. The method as claimed in claim 8, wherein the wireless transmission comprises a Bluetooth transmission.

10. The method as claimed in claim 6, wherein the image surface comprises a projection wall.

* * * * *